United States Patent Office 3,075,830
Patented Jan. 29, 1963

3,075,830
CONTINUOUS FLUID BED ADSORPTION OF BROMINE ON ANION EXCHANGE RESIN
Leland Clarence Schoenbeck, Wilmington, Del., assignor to E. I. du Pont de Nemours and Company, Wilmington, Del., a corporation of Delaware
No Drawing. Filed Mar. 30, 1961, Ser. No. 99,348
4 Claims. (Cl. 23—216)

This invention is directed to the adsorption of bromine on anion exchange resins. In particular, the present novel process relates to the recovery of bromine from industrially important brines in a continuous counter-current fluid bed process.

When bromine water is allowed to flow down through a column of a strong base anion exchange resin in the chloride or bromide form, bromine is adsorbed from the solution by the resin. (The resin's fixed cationic sites, its quaternary ammonium groups, hold the bromine as polybromohalide anions so that in effect the original chloride ions of the resin have been exchanged for polyhalide ions.) Column (or bed) operation should be particularly suited for recovering bromine from dilute solutions because of the counter-current contact it provides. However, such operation has important drawbacks; for example, the incoming solution must be distributed uniformly onto the surface of and through the bed; the bed tends to function as a filter mat and clogs easily; and, a considerable pressure drop tends to develop through the bed. Non-uniform distribution of the influent solution may lead to channeling, premature breakthroughs, and excessive leakage, which means decreased capacity. The bed's resistance to the flow of solution must be overcome by expenditure of energy, i.e. with pumps. Solid matter from the solution building up on the bed as a clogging mat has to be removed by backwashing. These problems become magnified when dilute raw solutions are processed because raw waters contain significant amounts of solid matter and large volumes have to pass through a relatively small volume of exchanger. Thus, costs of installation, operation and maintenance tend to be rather high, the more so the more dilute and raw the solution to be treated.

It is, therefore, an object of this invention to provide a method for the efficient recovery of bromine on anion exchange resins, which method provides counter-current contact of the resin with the bromine solution while avoiding pressure drops and eliminating the need for frequent backwashing of the resin.

These and their objects will be apparent in the following description and claims.

More specifically, the present invention is directed to a counter-current fluid bed process for recovering bromine from aqueous solution by adsorption on an anion exchange resin, which process comprises (1) passing a bromine solution up through a bed of resin granules whereby bromine is adsorbed from solution on the resin with the resin becoming bromine-rich and substantially more dense; (2) adjusting the flow of the bromine solution such that the flow is non-turbulent at a rate that is sufficient to fluidize the bed but is less than the settling rate of bromine-rich resin, the bromine-rich resin thus settling and accumulating at the lower end of the bed, (3) drawing off bromine-rich settled resin, (4) introducing less dense bromine-lean resin at the upper end of the column for contact with the upcoming bromine-rich solution, and repeating the process.

An important embodiment of this invention is the recovery of bromine from seawater or other industrially important brines in an overall process comprising acidifying the brine and oxidizing the bromide ion content thereof to the molecular form, contacting such solution with a strong base anion exchange resin having affinity for bromine, in a continuous counter-current fluid bed manner as above defined, to result in adsorption of bromine on the resin, separating bromine-laden resin from the solution and recovering bromine from the resin by appropriate means.

In the practice of the present invention, counter-current contact of the bromine solution with the resin may be effected in a vertically disposed column equipped with a porous plate or screen at the lower end (for supporting a bed of resin granules at rest), an inlet means at the lower end for introducing bromine solution up through the resin bed, an outlet means at the upper end of the column for leading away spent solution, another outlet means at the lower end of the column for drawing off bromine-laden resin, and another inlet means at the upper end of the column for adding bromine-lean resin.

Bromine solution is passed into the column from the bottom under conditions of non-turbulent flow, the rate being adjusted such that it is great enough to maintain the resin bed (a multiplicity of granules) in an expanded fluid-like state but not so great as to carry the resin out of the column or to prevent the settling of bromine-laden resin in the column. In contact, the resin becomes bromine-rich and more dense, the solution bromine-poor.

Significantly, the resin becomes richer in bromine and more dense, and it settles faster than the less dense bromine-lean resin.

In continuous operation, the bromine-rich resin is taken off at the bottom while bromine-poor (e.g. bromine-free) resin is added at substantially the same rate at the top and allowed to settle through the up-flowing solution. Take off and addition of resin can be intermittent or continuous but preferably are coordinated to provide a steady state wherein the amount of resin in contact with the volume of solution in the column at any one time is held approximately constant.

The flow rate may vary widely so long as it provides an expanded fluid bed and does not prevent settling of bromine-laden resin. For example the bed may be expanded to about twice to 200 times its normal volume (i.e. that of the settled resin at rest). In general, the greater the flow rate the greater the degree of expansion of the bed, hence the greater the ratio of solution volume to normal resin volume and the longer the time that the resin is in contact with solution. The maximum degree of expansion is limited only by the column height. The outlet means at the upper end of the column is positioned in accord with the selected column height and flow rate.

In general the smaller the particle size of the resin and the more dense the solution, the lower the flow rate needed to achieve a given degree of bed fluidity. To illustrate, in the recovery of bromine from acidified and oxidized seawater (sp. gr. 1.024 at 18° C.) with a typical commercial strong base anion exchange resin in the chloride form, e.g. Dowex 1X8 (Dow Chemical Company) having a particle size in the range 16 to 400 mesh and a specific gravity of from 1.1 to 1.2, the solution flow rates may vary from about 1 to 60 gallons per minute per square foot of resin bed cross-sectional area (column cross-sectional area), more usually 5 to 50 g.p.m./ft.$^2$, depending on the particular resin, e.g. 7 g.p.m./ft.$^2$ with 50–100 mesh resin and 45 g.p.m./ft.$^2$ with the larger sized 16–20 mesh resin. The flow rate may also vary depending on the capacity of the resin for bromine, the desired loading (i.e. percent of capacity), and the concentration of bromine in the solution.

The ratio of solution to resin is not important provided enough solution is introduced to fluidize the bed under the conditions of laminar, i.e. non-turbulent flow indicated above. Usually the quantity of resin under steady state conditions corresponds to about 0.1 to 10 volumes of resin per 100 volumes of the bromine solution, the volume of resin being that of water-saturated resin at rest.

The present novel method of operation is ordinarily carried out at atmospheric temperatures and pressures. While the temperature may range upwards from just above the freezing point of the solution to be treated, it is preferably kept below about 60° C. to minimize halogen attack on the resin itself.

The process of the present invention is further illustrated by the following representative example.

The source of the bromine solution is immaterial to the present invention. However, an important embodiment is the recovery of bromine from dilute solutions, especially from seawater and other industrially important brines where bromine concentrations are of the order of 50 to 5000 p.p.m. Where the bromine is originally as bromide it is oxidized to bromine, as by chlorinating with chlorine, hypochlorous acid, and the like. Aqueous solutions of the halogens are normally acidic. For the bromine adsorption process the pH of the solution is kept below 7, preferably below 5, most usually at 3–4. When needed an acid such as hydrochloric, hydrobromic, sulfuric, or other acid can be added for pH control. For example, seawater is pumped from the sea, is allowed to settle in a basin and passed through screens to remove sediment and other debris. It is then acidified with hydrochloric or sulfuric acid or mixtures thereof to pH 3 to 4. Chlorine is fed in, in an amount at least sufficient to oxidize bromide to bromine in accordance with the equation, $Cl_2 + 2Br^- = Br_2 + 2Cl^-$. Preferably the chlorine oxidant is in excess, the excess amounting to say 0.2 to 1 atom of Cl per bromide ion. Larger amounts of chlorine appear unnecessary. The amount introduced can be determined and monitored by calibrating the system in terms of the oxidation potential developed between platinum and calomel electrodes. The solution is now ready for contact with the resin in accordance with the method of the invention as defined.

Normally the resin will be a strong base anion exchange resin although again this is immaterial to the method of effective contact of said resin with the bromine solution. Any anion exchange resin should be operative. Suitable and available strong base anion exchange resins are of the quaternary ammonium type. They are essentially long chain-like and web-like water-insoluble molecules characterized by having quaternary ammonium groups as the fixed, i.e., non-exchangeable cationic sites. Associated with these sites are anions (which make the resin electrically neutral and which are the exchangeable constituents) that may be varied as desired by proper treatment as is well known in the art. Typical resins are based on the polystyrene backbone; divinylbenzene cross-linking units provide the necessary degree of dimensional stability and water-insolubility to the polymer, while groups of the formula, $$-\text{alkylene-}\overset{+}{N}R_1R_2R_3$$

provide the positively charged site. $R_1$, $R_2$ and $R_3$ are usually alkyl such as methyl, ethyl and the like, but may be alkylol such as hydroxyethyl, and may be joined to constitute along with the nitrogen atom a heterocyclic radical such as methylpiperidinium or pyridinium. Resins such as these may be prepared by chloromethylating a polystyrene-divinylbenzene copolymer, then reacting with the appropriate tertiary amine.

Specific resins that may be employed in the present invention are described in U.S. Patent 2,591,573. Other quaternary ammonium type resins that may be employed are disclosed by U.S. Patents 2,630,427 and 2,597,494 and U.S. Patent 2,597,440. A specific example is the strong base anion exchange resin prepared according to the Examples A—B—C of U.S. Patent 2,591,573. The hydroxide form of this resin is converted to the chloride form, for example, by flowing seawater through it. Also, it is understood that commercially available Amberlite IRA 400 listed in the following table is of the class of strong base anion exchange resins described in said U.S. Patent 2,591,573. The resins described in U.S. Patent 2,900,352 can also be used; for example, the resin prepared according to Example 5 of this patent. Also, the resins described broadly and as specifically shown in Example 2 in U.S. Patent 2,614,099 may be used in this process.

Suitable commercially available resins are given below. The type I resins are understood to have $$-C_6H_4-CH_2-\overset{+}{N}(CH_3)_3$$

groups, the type II resins to contain $$-C_6H_4-CH_2-\overset{+}{N}(CH_3)_2CH_2CH_2OH$$

groups, the pyridine type to be based on pyridine as the source of the cationic sites.

*Strong Base Aanion Exchange Resins*

| Commercial name | Source | Quaternary Ammonium type |
|---|---|---|
| Duolite A–101 | Chemical Process Co. of Redwood City, California. | I |
| Duolite A–101D | | I |
| Retardion 11A8 | | I |
| Dowex 2 | Dow Chemical Co., of Midland, Michigan. | II |
| Dowex 21K | | II |
| Dowex 1 | | I |
| Dowex 11 | | I |
| Amberlite IRA 400 | Rohm and Haas Co. of Phila., Pa. | I |
| Amberlite IRA 401 | | I |
| Amberlite IRA 402 | | I |
| Amberlite IRA 410 | | II |
| Amberlite IRA 411 | | II |
| Permutit S–1 | The Permutit Co. of New York, New York. | I |
| Permutit SK | | Pyridine |

The herein described resins are normally obtained as granules or uniform beads, usually in the hydroxide or chloride form and in particle sizes of from about 16 to 400 mesh. The chloride form is preferred. However, any form of the resin may be employed, so long as the anionic component is exchangeable by chloride and bromide ions, e.g. the hydroxide, acetate, nitrate, bisulfate and sulfate, phosphate, fluoride, and the like forms. Treating any of the heretofore described resins with bromine in sodium chloride brine, for example, results in the anions of the resin being displaced by a bromine-containing polyhalide ion. Mixtures of these resins may be used in practicing the present invention.

Normally the strong base anion exchange resins, as prepared by the known methods and obtained commercially, are in part reactive towards free bromine and chlorine, and at first irreversibly consume some of this halogen in undergoing substitution or addition reactions. To obtain consistent adsorption results it may be necessary to condition the resin by pretreatment with bromine or chlorine or both, in effect to "burn away" (or halogenate) labile (or reactive) sites and produce a resin providing consistently high yields of recoverable bromine by the absorption process. Conveniently the resin, say the commercial product in suitable, e.g. chloride form, is subjected to the over-all cycle of being contacted with the bromine source solution in final form, e.g. acidified and chlorinated seawater to adsorb bromine, then treated with a reducing agent, e.g. $SO_2$ in the presence of water to reduce and remove bromine, then washed with brine to complete the elution step. The cycle is repeated until reproducible results are obtained in terms of bromine recoveries. Occasional washing with an organic solvent e.g. acetone helps keep the resin clean of water-insoluble but solvent-soluble organic matter that may contribute to clogging of the resin pores.

The bromine can be recovered from the resin in a variety of ways, including extraction, steam distillation, chemical reaction to convert the bromine into recoverable inorganic bromides and/or organic bromo compounds. The bromine is conveniently recovered from the resin by reduction to bromide and removal as a concentrated aqueous phase. When chlorine is present along with bromine in the adsorption process, as when 100% excess $Cl_2$ is used as oxidant for seawater, it is also adsorbed. Reduction of the adsorbed bromine and chlorine with aqueous sulfur dioxide produces a mixture of hydrochloric, hydrobromic and sulfuric acids, in accordance with the equation, $$X_2 + SO_2 + 2H_2O = 2HX + H_2SO_4$$

where $X_2$=bromine, chlorine or mixtures or interhalogen compounds thereof, and HX=hydrogen halide.

The bromine value of this now relatively concentrated acid solution is recovered by reoxidation with chlorine and stripping by known means as in the conventional air blowing or steaming processes. The residual acid is used to acidify the incoming seawater.

EXAMPLE

A. A strong base anion exchange resin containing trimethyl benzyl ammonium groups in the chloride form is prepared essentially as described in Example A—B—C of U.S. Patent 2,591,573. The sample prepared consists of a multiplicity of spherical particles of mesh size 50 to 100, has a moisture content of 43% and an exchange capacity for chloride ion of 1.3 meg./ml. wet resin. The resin is preconditioned by backwashing to remove fines then is placed in seawater that has been acidified and chlorinated as described above. After 3–4 days the resin is removed and is washed first with aqueous sulfurous acid (to reduce completely the adsorbed halogen) and finally with NaCl brine until it is bromide-free.

B. A sample of seawater analyzing 58 p.p.m. Br is acidified to pH 3.5 by the addition of a concentrated 1:1 premix of sulfuric and hydrochloric acids in seawater and chlorinated by the addition of chlorine in an amount corresponding to about 1.8 atoms of Cl per Br ion.

C. The above acidified and chlorinated, i.e. brominerich seawater is pumped into the bottom of a 2-inch diameter by 22 foot polyvinyl chloride column at a flow rate of 650 ml./min. (about 7 g.p.m./ft.$^2$, at which rate the flow is laminar) and is drawn off at the top. The total amount in the column at any one time is 13,600 ml. The above-described bromine-free resin is fed into the column at the top just below the water outlet line, initially in an amount corresponding to 80 ml. settled resin and thereafter at a rate of 0.82 ml./min. Resin which settles to the bottom of the column is drawn off periodically and the column is operated in this manner until steady state conditions are obtained and the residual total bromine content of the spent seawater coming off the top of the column is minimal. In this case the spent stream contains 15 p.p.m. Br, which corresponds to a 74% recovery of bromine adsorbed on the resin, i.e.

$$\frac{58-15}{58} \times 100$$

at a resin loading of 34 mg. bromine/ml. resin (i.e. 58−15×0.650/0.82).

It should be noted that in contrast a typical batch procedure, wherein all the resin and all the bromine-rich seawater are mixed and held in contact until maximum absorption occurs, gives the following results: The residual solution contains 23 of the original 58 p.p.m. (60% yield of recovered bromine) and the resin loading is only 28 mg./ml.

As mentioned above, the resin becomes more dense and settles faster as it takes up bromine.

Typical are the data below obtained with the resin of this example.

| Bromine loading, mg.Br/ml. resin | Specific gravity |
| --- | --- |
| 0 | 1.138 |
| 10 | 1.175 |
| 20 | 1.208 |
| 30 | 1.242 |
| 40 | 1.292 |

With non-turbulent flow of solution up through the resin particles under steady-state conditions, a concentration gradient is established wherein bromine-rich solution is in contact with bromine-rich resin at the lower end of the fluidized bed and bromine-lean solution is in contact with bromine-lean resin at the upper end of the column, which is the essence of counter-current contact. The density increase of the resin with bromine uptake and its greater accumulation at the lower end due to its greater settling rate further accentuates the counter-current effect and tends to result in higher resin loadings and yields of bromine per unit volume of resin taken off at the bottom of the column, and thus the efficiency of the process is increased.

It should be noted that since the bed is fluidized and offers substantially no resistance to the upflowing solution there is essentially no pressure drop through the bed, and no tendency of the bed to function as a filter bed, as is characteristic of the bed in the conventional down-through flow method.

Any of the heretofore-described anion exchange resins may be substituted in the preceding example to give substantially the same results. Other practical variations and modifications may, of course, be made by one skilled in the art within the scope of this invention. Column diameter and height, solution flow rate, bromine content of the starting solution, etc. may be varied widely as herein discussed to give similar results.

The particular column utilized in the practice of the novel process of this invention is not critical and may be readily selected by one skilled in the art without resorting to experimentation.

As many apparently widely different embodiments of this invention may be made without departing from the spirit and scope thereof, it is to be understood that this invention is not limited to the specific embodiments thereof except as defined in the appended claims.

The embodiments of the invention in which an exclusive property or privilege is claimed are defined as follows:

1. A counter-current fluid bed process for recovering bromine from aqueous solution by adsorption on an anion exchange resin, which process comprises (1) passing a bromine solution up through a bed of resin granules in the form selected from the group consisting of the chloride form and the bromide form whereby bromine is absorbed from solution on the resin with the resin becoming bromine-rich and substantially more dense; (2) adjusting the flow of the bromine solution such that the flow is non-turbulent at a rate that is sufficient to fluidize the bed but is less than the settling rate of bromine-rich resin, the bromine-rich resin thus settling and accumulating at the lower end of the bed, (3) drawing off bromine-rich settled resin, followed by recovering bromine from said resin.

2. The process of claim 1 wherein bromine has been recovered from said bromine-rich settled resin, the resulting bromine-lean resin being introduced at the upper end of said column for contact with said upcoming bromine-rich solution.

3. A counter-current fluid bed process for recovering bromine from sea water by adsorption on an anion exchange resin, which process comprises (1) passing a bromine solution prepared from sea water up through a bed of strong base type anion exchange resin granules in the chloride form whereby bromine is absorbed from solution on the resin with the resin becoming bromine-rich and substantially more dense; (2) adjusting the flow of the bromine solution such that the flow is non-turbulent at a rate that is sufficient to fluidize the bed but is less than the settling rate of bromine-rich resin, the bromine-rich resin thus settling and accumulating at the lower end of the bed, drawing off bromine-rich settled resin, followed by recovering bromine from said resin.

4. The counter-current fluid bed process of claim 3 wherein the strong base type anion exchange resin granules are in the bromide form.

References Cited in the file of this patent
UNITED STATES PATENTS

| | | |
|---|---|---|
| 2,582,099 | Wilcox et al. | Oct. 31, 1950 |
| 2,744,840 | Daniels et al. | May 8, 1956 |
| 2,945,746 | Shaw | July 19, 1960 |

UNITED STATES PATENT OFFICE
CERTIFICATE OF CORRECTION

Patent No. 3,075,830                          January 29, 1963

Leland Clarence Schoenbeck

It is hereby certified that error appears in the above numbered patent requiring correction and that the said Letters Patent should read as corrected below.

Column 4, line 20, for "Aanion", in italics, read -- Anion --, in italics; line 61, for "absorption" read -- adsorption --; column 6, line 58, and column 7, line 2, for "absorbed" read -- adsorbed --.

Signed and sealed this 27th day of August 1963.

(SEAL)
Attest:

ERNEST W. SWIDER
Attesting Officer

DAVID L. LADD
Commissioner of Patents